US012499805B2

(12) United States Patent
Wu et al.

(10) Patent No.: US 12,499,805 B2
(45) Date of Patent: Dec. 16, 2025

(54) DISPLAY DEVICE WITH ADJUSTABLE GRAYSCALE VALUE AND DISPLAY METHOD THEREOF

(71) Applicant: GIGA-BYTE TECHNOLOGY CO., LTD., New Taipei (TW)

(72) Inventors: Shu-Cheng Wu, New Taipei (TW); Kuei-Shan Chang, New Taipei (TW); Shih-Chieh Chou, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 18/895,277

(22) Filed: Sep. 24, 2024

(65) Prior Publication Data

US 2025/0166549 A1 May 22, 2025

(30) Foreign Application Priority Data

Nov. 21, 2023 (TW) ................................ 112144867

(51) Int. Cl.
*G09G 3/20* (2006.01)

(52) U.S. Cl.
CPC ....... *G09G 3/2007* (2013.01); *G09G 2320/02* (2013.01); *G09G 2360/16* (2013.01)

(58) Field of Classification Search
CPC ............. G09G 3/2007; G09G 2320/02; G09G 2360/16
See application file for complete search history.

(56) References Cited

U.S. PATENT DOCUMENTS 5,235,434 A * 8/1993 Wober .................. H04N 19/86 358/448
11,955,055 B1 * 4/2024 Huang .................... G09G 3/32
(Continued)

FOREIGN PATENT DOCUMENTS

JP 2005107521 4/2005
KR 20230060767 5/2023
(Continued)

OTHER PUBLICATIONS

"Office Action of Korea Counterpart Application", issued on Mar. 20, 2025, p. 1-p. 5.
(Continued)

*Primary Examiner* — Antonio Xavier
(74) *Attorney, Agent, or Firm* — JCIPRNET

(57) ABSTRACT

A display device with adjustable grayscale values and a display method thereof are provided. The display device includes a display panel, a communication interface, and a controller. The communication interface is used to receive display data of a display screen. The controller is electrically connected to the display panel and the communication interface, and is used to drive the display panel to display a display screen according to the display data. In response to the controller performing the flashbang assist function, the controller analyzes the display data to detect multiple gray-scale values of multiple pixels in the display screen. In response to the controller detecting that the grayscale values of the pixels in the display screen are all higher than or equal to the first threshold, the controller adjusts the display data to reduce at least part of the grayscale values.

16 Claims, 5 Drawing Sheets

(56) References Cited

U.S. PATENT DOCUMENTS

| | | | | |
|---|---|---|---|---|
| 2003/0107681 | A1* | 6/2003 | Otawara | G09G 3/2007 348/673 |
| 2010/0077353 | A1* | 3/2010 | Moon | G06F 16/64 715/810 |
| 2014/0132650 | A1 | 5/2014 | Shin et al. | |
| 2016/0035285 | A1 | 2/2016 | Jung | |
| 2016/0350940 | A1* | 12/2016 | Wang | G06T 7/0012 |
| 2017/0353689 | A1 | 12/2017 | Choe et al. | |
| 2018/0139422 | A1* | 5/2018 | Moule | G06T 5/70 |
| 2018/0308434 | A1* | 10/2018 | Nakanishi | G09G 3/3406 |
| 2018/0330917 | A1* | 11/2018 | Abe | G01N 23/225 |
| 2019/0156772 | A1* | 5/2019 | Yabuki | G09G 3/2007 |
| 2019/0341003 | A1 | 11/2019 | Inamura | |
| 2020/0160813 | A1* | 5/2020 | Aurongzeb | G09G 3/36 |
| 2021/0295783 | A1* | 9/2021 | Shin | G09G 3/3291 |
| 2021/0312885 | A1* | 10/2021 | Payne | G02B 27/0172 |
| 2023/0162651 | A1 | 5/2023 | Park et al. | |

FOREIGN PATENT DOCUMENTS

| | | |
|---|---|---|
| TW | 202230322 | 8/2022 |
| TW | I822271 | 11/2023 |

OTHER PUBLICATIONS

"Search Report of Europe Counterpart Application", issued on Mar. 12, 2025, p. 1-p. 10.

"Office Action of Japan Counterpart Application", issued on Sep. 24, 2025, p. 1-p. 4.

* cited by examiner

DISPLAY DEVICE WITH ADJUSTABLE GRAYSCALE VALUE AND DISPLAY METHOD THEREOF

CROSS-REFERENCE TO RELATED APPLICATION

This application claims the priority benefit of Taiwan application serial no. 112144867, filed on Nov. 21, 2023. The entirety of the above-mentioned patent application is hereby incorporated by reference herein and made a part of this specification.

BACKGROUND

Technical Field

The disclosure relates to a display technology, and in particular to a display device and a display method with adjustable grayscale values.

Description of Related Art

When a user is hit by a flashbang while playing a shooting game, the screen will instantly turn completely void, causing discomfort to the user's eyes. Moreover, when the screen appears completely void, the screen will first appear void for a period of time before gradually returning to the original normal game screen. As a result, the user's response to the game will be slower.

SUMMARY

The disclosure provides a display device with adjustable grayscale values and a display method thereof, which can provide proper display effects.

The display device with adjustable grayscale values of the disclosure includes a display panel, a communication interface, and a controller. The communication interface is configured to receive a display data of a display screen. The controller is electrically connected to the display panel and the communication interface, and is configured to drive the display panel to display the display screen according to the display data. In response to the controller performing the flashbang assist function, the controller analyzes the display data to detect multiple grayscale values of multiple pixels in the display screen. In response to the controller detecting that the grayscale values of the pixels in the display screen are all higher than or equal to a first threshold, the controller adjusts the display data to reduce at least part of the grayscale values.

In an embodiment of the disclosure, in response to the controller detecting that the grayscale values of the pixels in the display screen are all first grayscale values, the controller adjusts the display data to reduce the grayscale values of the pixels to second grayscale value. The first grayscale value is greater than the second grayscale value.

In an embodiment of the disclosure, the first grayscale value is 255, and the second grayscale value is 125.

In an embodiment of the disclosure, in response to the controller detecting that the grayscale values of the pixels in the display screen are higher than or equal to the first threshold, the controller adjusts the display data to roll off the grayscales value.

In an embodiment of the disclosure, the first threshold is 180.

In an embodiment of the disclosure, in response to the controller detecting that a grayscale difference between any adjacent two of the pixels in the display screen is greater than a second threshold, the controller adjusts the display data to reduce one of the any adjacent two of the pixels with a higher grayscale value, so that the grayscale difference between the any adjacent two of the pixels is less than a third threshold.

In an embodiment of the disclosure, the first threshold is greater than the second threshold and the third threshold, and the second threshold is greater than the third threshold.

In an embodiment of the disclosure, the second threshold is 125, and the third threshold is 50.

In an embodiment of the disclosure, the display device further includes a five-way key. The five-way key is electrically connected to the controller. In response to the five-way key being triggered, the controller performs the flashbang assist function.

The display method with adjustable grayscale value of the disclosure includes the following steps: receiving the display data of the display screen through the communication interface; in response to the controller performing the flashbang assist function, detecting the grayscale values of the pixels in the display screen through analyzing the display data by the controller; in response to the controller detecting that the grayscale values of the pixels in the display screen are all higher than or equal to the first threshold, reducing at least part of the grayscale values through adjusting the display data by the controller; and driving the display panel to display the adjusted display screen according to the adjusted display data through the controller.

Based on the above, the display device and the display method with adjustable grayscale values of the disclosure can automatically detect pixel changes of the display screen through the display device, and automatically adjust the display data to provide a proper display effect.

To make the aforementioned more comprehensible, several embodiments accompanied with drawings are described in detail as follows.

DESCRIPTION OF THE EMBODIMENTS

Figure 1:
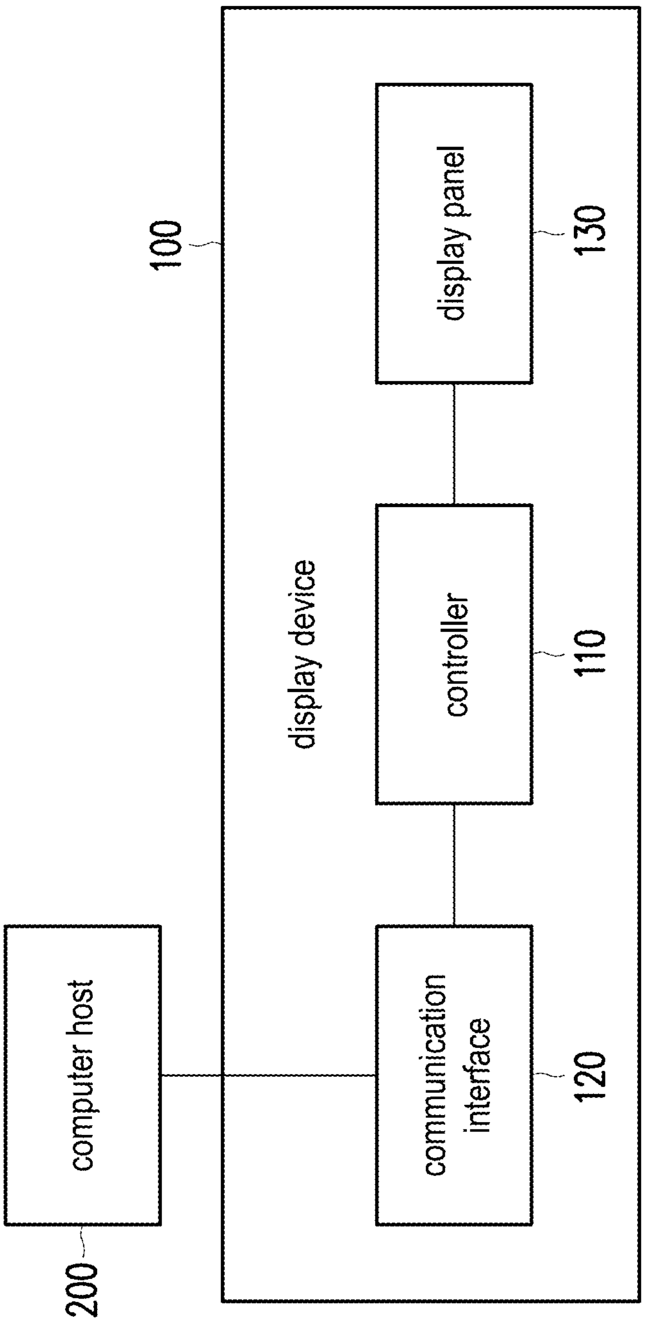
FIG. 1 is a schematic diagram of a display device with adjustable grayscale values according to an embodiment of the disclosure.

Reference will now be made in detail to the exemplary embodiments. Examples of exemplary embodiments are described in the accompanying drawings. Wherever possible, the same reference symbols are used to denote the same or similar parts in the drawings and the description.

FIG. 1 is a schematic diagram of a display device with adjustable grayscale values according to an embodiment of the disclosure. Referring to FIG. 1, a display device 100 includes a controller 110, a communication interface 120, and a display panel 130. The controller 110 is electrically connected to the communication interface 120 and the display panel 130. The display device 100 may be connected to a computer host 200 through the communication interface 120. In this embodiment, the computer host 200 may execute a game program and provide a display data of a game screen to the display device 100 so that the display device 100 may display the corresponding display screen through the display panel 130 according to the display data. However, the disclosure is not limited to game screens. In this embodiment, the display device 100 has a function of adjusting grayscale values.

In this embodiment, the controller 110 may include a display driver, a memory, and related control logic chips. The controller 110 may obtain the display data (display signal) from the computer host 200 through the communication interface 120, and may adjust the display data to drive the display panel 130. In this embodiment, the display panel 130 may be, for example, a liquid crystal display panel, a light-emitting diode (LED) display panel, an organic light-emitting diode (OLED) display panel, or a quantum dot display panel, etc., and the disclosure is not limited thereto.

Figure 2:
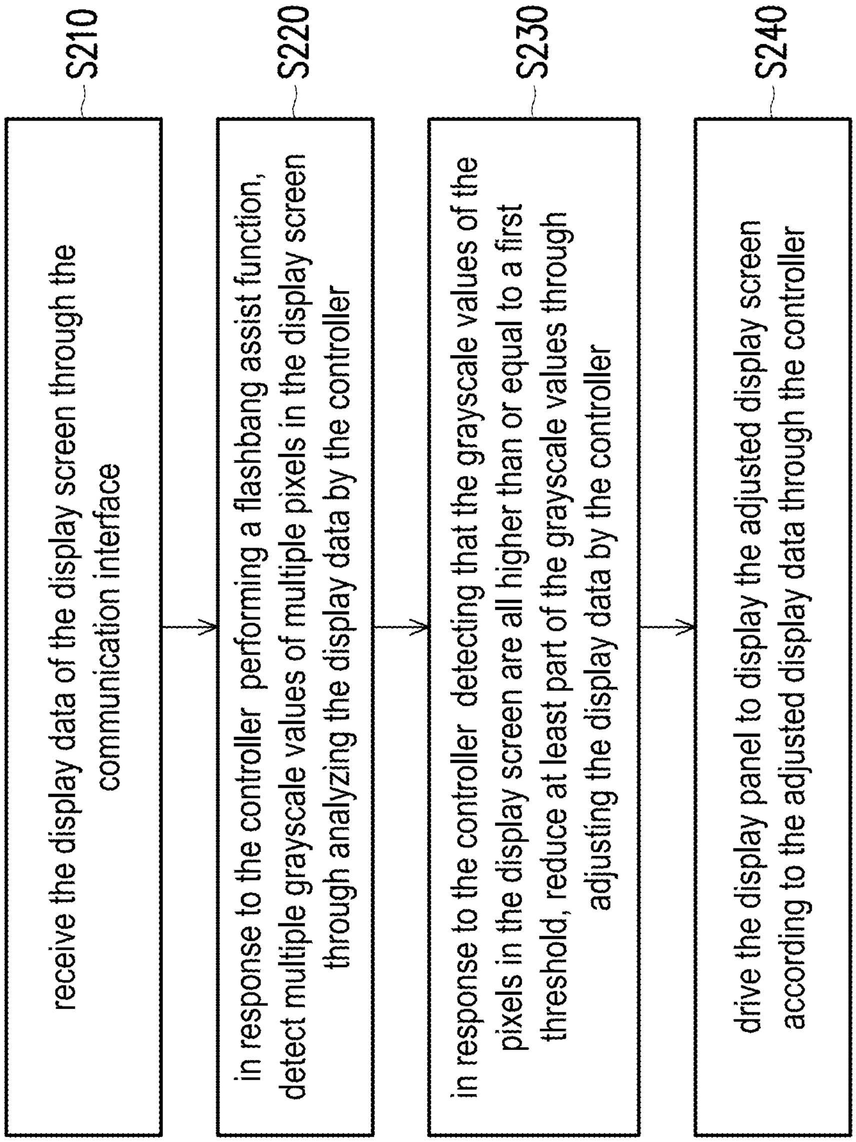
FIG. 2 is a flowchart of a display method with adjustable grayscale values according to an embodiment of the disclosure.

FIG. 2 is a flowchart of a display method with adjustable grayscale values according to an embodiment of the disclosure. Referring to FIG. 1 and FIG. 2, the display device 100 may perform the following steps S210 to S240. In step S210, the display device 100 may receive the display data of the display screen provided by the computer host 200 through the communication interface 120. In this embodiment, the display data is the display data of a shooting game screen, but the disclosure is not limited thereto. In step S220, in response to the controller 110 performing a flashbang assist function, the controller 110 may detect multiple grayscale values of multiple pixels in the display screen. In this embodiment, the display device 100 may further include a five-way key. The five-way key is electrically connected to the controller 110. In this regard, when the five-way key is triggered, the controller 110 may perform the flashbang assist function to automatically detect the display screen. The flashbang assist function means that the controller 110 may instantly detect the grayscale value of each of the pixels in the current display screen displayed by the display panel 130. In an embodiment, the five-way key may also be disposed on other input devices (such as a keyboard or a mouse) that are electrically connected to the display device 100 or the computer host 200. In addition, in another embodiment, the controller 110 may instantly detect the grayscale values of the pixels in a partial area of the current display screen displayed by the display panel 130.

In step S230, in response to the controller 110 detecting that the grayscale values of the pixels in the display screen to be displayed by the display panel 130 are all higher than or equal to a first threshold, the controller 110 may adjust the display data to reduce at least part of the grayscale values. In step S240, the controller 110 may drive the display panel 130 to display the adjusted display screen according to the adjusted display data. It should be noted that the grayscale value mentioned in the disclosure refers to a brightness level displayed by the pixel. In this embodiment, when the grayscale values of the pixels of the current display screen to be displayed by the display panel 130 suddenly increase (that is, an increased screen brightness, an excessively bright screen, or a void full screen due to the influence of flashbangs in the game), the controller 110 may automatically adjust the display data of the current (i.e., current frame) or next display screen (i.e., next frame), so that the current (i.e., current frame) or next display screen (i.e., next frame) may be dimmed immediately, rather than waiting for the game program to dim. Therefore, the display device 100 of this embodiment may automatically detect whether the current display screen is excessively bright, and automatically adjust the display data of the next display screen received from the computer host 200 through the controller 110. The display device 100 does not notify the computer host 200 of a brightness adjustment operation of adjusting the screen. That is, the display device 100 does not affect or change the data output by the game program.

Figure 3:
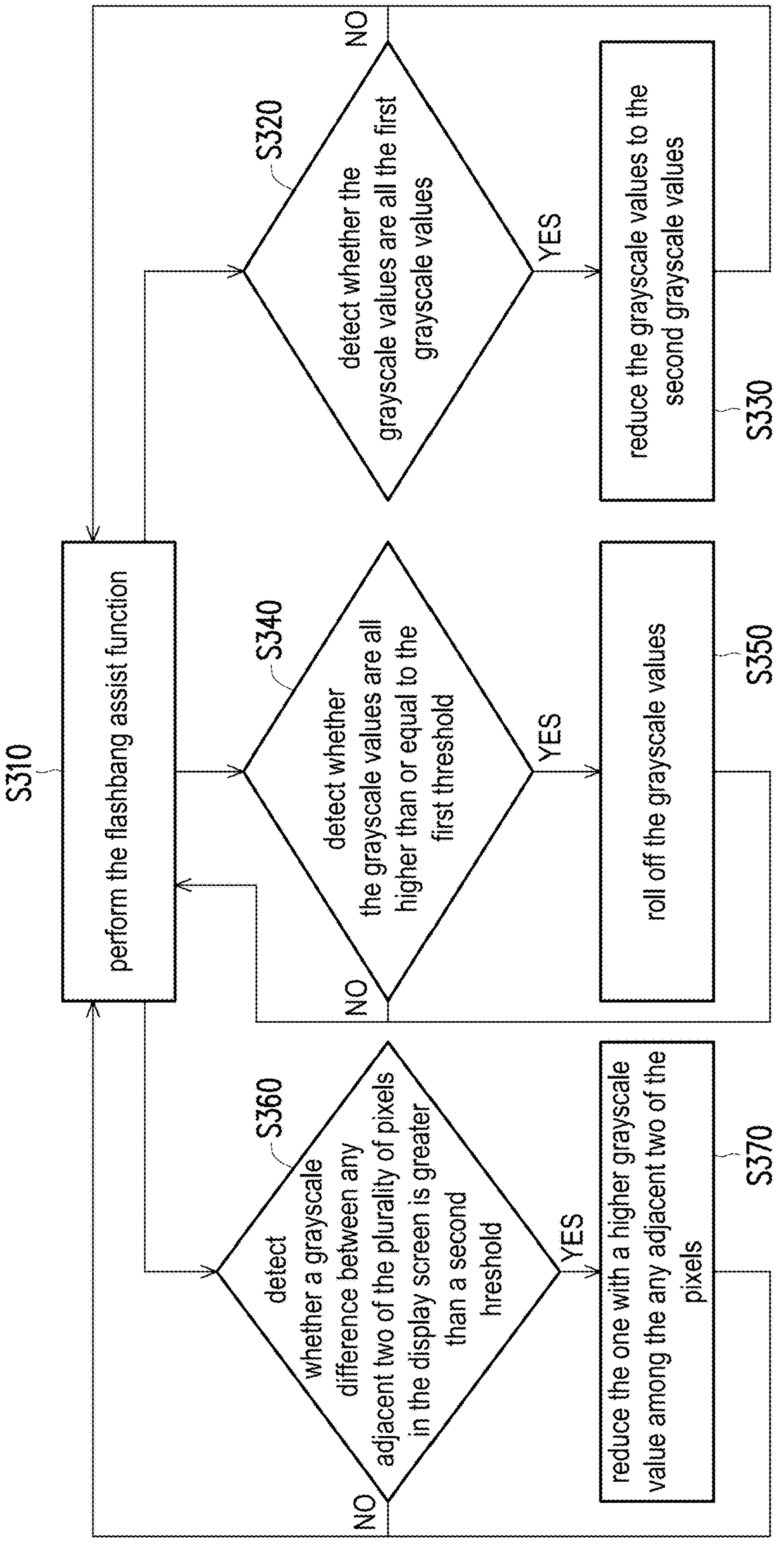
FIG. 3 is a flowchart of a display method according to another embodiment of the disclosure.

FIG. 3 is a flowchart of a display method according to another embodiment of the disclosure. Referring to FIG. 1 and FIG. 2, the display device 100 may perform the following steps S310 to S370. As mentioned first, the steps S320, S340, and S360 may be executed simultaneously or sequentially.

In step S310, the controller 110 may perform the flashbang assist function to detect the grayscale values of the pixels in the display screen displayed by the display panel 130. In step S320, the controller 110 may detect whether the grayscale values are first grayscale values. If "no", perform step S310 again. If "yes", in step S330, the controller 110 may reduce the grayscale values to second grayscale values.

Figure 4:
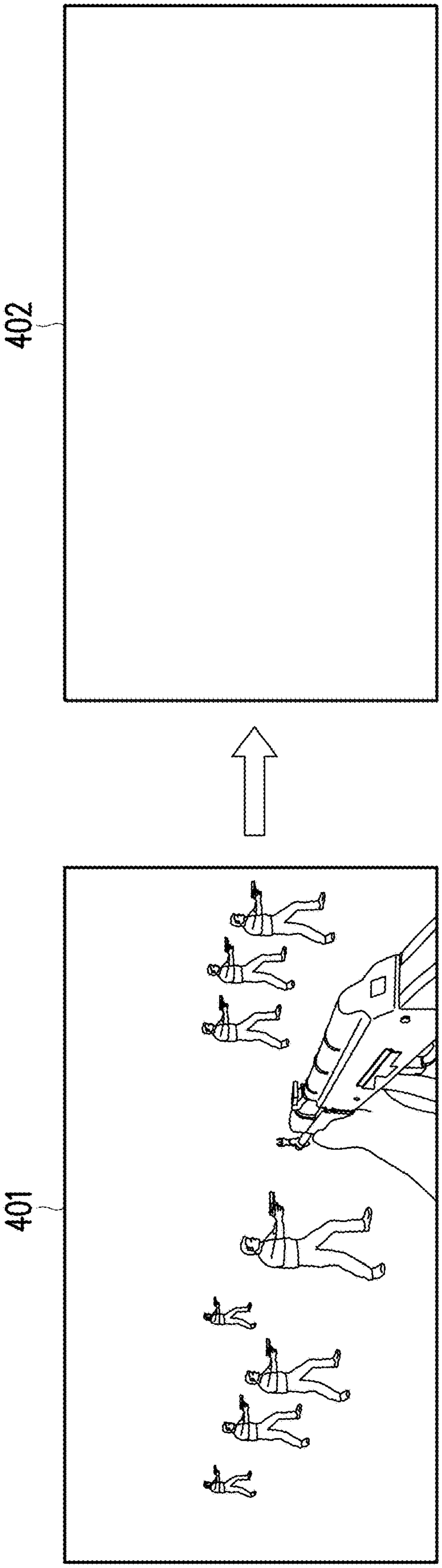
FIG. 4 is a schematic diagram of changes in the display screen according to an embodiment of the disclosure.

Specifically, in this embodiment, when the controller 110 detects that the grayscale values of the pixels in the display screen are all the first grayscale values, the controller 110 may adjust the display data to reduce the grayscale values of the pixels to the second grayscale values. The first grayscale value is greater than the second grayscale value. In an embodiment, the first grayscale value may be 255, and the second grayscale value may be 125. In this regard, referring to FIG. 4, FIG. 4 is a schematic diagram of changes in the display screen according to an embodiment of the disclosure. The display panel 130 may display a display screen 401 in the previous frame. When affected by the flashbang in the game, the display panel 130 may display as a display screen 402 in the current frame. That is, when the screen is void (completely void), the controller 110 may detect that the grayscale value of each of the pixels of a display screen 402 displayed by the display panel 130 is 255. Therefore, the display panel 130 may automatically reduce the grayscale values of the pixels in the display screen 402 or the next display screen to immediately or quickly reduce the brightness of the display screen.

Figure 5:
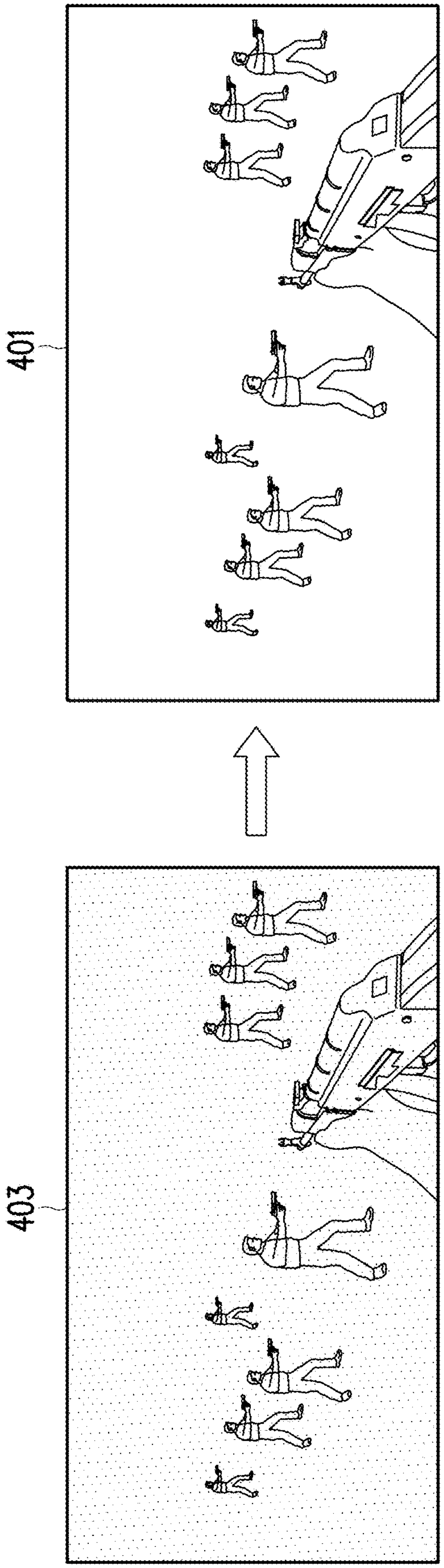
FIG. 5 is a schematic diagram of changes in the display screen according to an embodiment of the disclosure.

In step S340, the controller 110 may detect whether the grayscale values are all higher than or equal to the first threshold. If "no", the step S310 is performed again. If "yes", in step S350, the controller 110 may roll off the grayscale values. Specifically, in this embodiment, the first threshold may be 180, but the disclosure is not limited thereto. When the controller 110 detects that the grayscale values of the pixels in the display screen are all higher than or equal to 180, the controller 110 may adjust the display data to roll off the grayscale values. The controller 110 may reduce proportionally according to the amount of the grayscale value, or reduce by looking up a table, but the disclosure is not limited thereto. In this regard, referring to FIG. 5, FIG. 5 is a schematic diagram of changes in the display screen according to an embodiment of the disclosure. The display panel 130 may display the display screen 402 in the previous frame. When affected by the flashbang in the game, the display panel 130 may display as a display screen 403 in the current frame. That is, when the screen brightness is excessively high (or does not return to a normal screen after being reduced in the step S330), the controller 110 may detect that the grayscale value of each of the pixels of the display screen 402 displayed by the display panel 130 is higher than or equal to 180. The controller 110 may adjust the display data to roll off the grayscale values. In this way, the controller 110 can quickly and effectively reduce or prevent the display screen displayed by the display panel 130 from being void.

In step S360, the controller 110 may detect whether a grayscale difference between any adjacent two of the pixels in the display screen is greater than a second threshold. If "no", the step S310 is performed again. If "yes", in step S370, the controller 110 may adjust the display data to reduce one of the any adjacent two of the pixels with a higher grayscale value, so that the grayscale difference between the any adjacent two of the pixels is less than a third threshold. Specifically, in this embodiment, the first threshold is greater than the second threshold and the third threshold, and the second threshold is greater than the third threshold. The second threshold is 125, and the third threshold is 50, but the disclosure is not limited thereto. The controller 110 may reduce the grayscale difference of the entire display screen. In this regard, referring to FIG. 5, the display panel 130 may display the display screen 402 in the previous frame. When affected by the flashbang in the game, the display panel 130 may display the display screen 403 in the current frame. That is, the screen brightness of the overall display screen is still slightly brighter (or does not recover to the normal screen after the step S330 or the step S350 is reduced), the controller 110 may detect that the grayscale difference between the any adjacent two of the pixels of the display screen 402 displayed by the display panel 130 is greater than 125 (the screen does not return to normal brightness). The controller 110 may further adjust the display data to reduce the one with a higher grayscale value among the any adjacent two of the pixels, so that the grayscale difference between the any adjacent two of the pixels may be less than 50. In this way, the controller 110 can quickly and effectively restore the display panel 130 to display the display screen with normal brightness.

To sum up, the display device and display method of the disclosure can effectively reduce the discomfort to the eyes of the user caused by the flashbang explosion in the game screen when the screen displays a completely void screen. Moreover, the display device and the display method of the disclosure can automatically optimize the void effect of the display screen when the subsequent display screen is not restored and a void screen is presented, so that the user can respond quickly and can quickly proceed the subsequent game operations normally. In this regard, the display device and the display method of the disclosure can detect the grayscale value of the entire display screen and adjust the grayscale value according to different conditions to minimize the discomfort caused by the flashbang to the eyes of the user.

Finally, it should be noted that the above embodiments are only used to illustrate, but not to limit, the technical solutions of the disclosure. Although the disclosure has been described in detail with reference to the above embodiments, persons skilled in the art should understand that the technical solutions described in the above embodiments may still be modified or some or all of the technical features thereof may be equivalently replaced. However, the modifications or replacements do not cause the essence of the corresponding technical solutions to deviate from the scope of the technical solutions of the embodiments of the disclosure.

What is claimed is:

1. A display device with adjustable grayscale values, comprising:

a display panel;

a communication interface, configured to receive a display data of a display screen; and a controller, electrically connected to the display panel and the communication interface, and configured to drive the display panel to display the display screen based on the display data, wherein the controller analyzes the display data to determine a plurality of grayscale values of a plurality of pixels in the display screen, wherein in response to the controller determining that the plurality of grayscale values of the plurality of pixels in the display screen are all higher than or equal to a first threshold, the controller adjusts the display data to reduce at least part of the plurality of grayscale values, wherein in response to the controller determining that a grayscale difference between any adjacent two of the plurality of pixels in the display screen is greater than a second threshold, the controller adjusts the display data to reduce the one with a higher grayscale value among the any adjacent two of the plurality of pixels in the display screen, so that the grayscale difference between any adjacent two of the plurality of pixels is less than a third threshold.

2. The display device according to claim 1, wherein in response to the controller determining that the plurality of grayscale values of the plurality of pixels in the display screen are all a first grayscale value, the controller adjusts the display data to reduce the plurality of grayscales of the plurality of pixels to a second grayscale value, wherein the first grayscale value is greater than the second grayscale value.

3. The display device according to claim 2, wherein the first grayscale value is 255, and the second grayscale value is 125.

4. The display device according to claim 1, wherein in response to the controller determining that the plurality of grayscale values of the plurality of pixels in the display screen are all higher than or equal to the first threshold, the controller adjusts the display data to roll off the plurality of grayscale values.

5. The display device according to claim 1, wherein the first threshold is 180.

6. The display device according to claim 1, wherein the first threshold is greater than the second threshold and the third threshold, and the second threshold is greater than the third threshold.

7. The display device according to claim 1, wherein the second threshold is 125 and the third threshold is 50.

8. The display device according to claim 1, further comprising:

a five-way key, electrically connected to the controller, wherein in response to the five-way key being triggered, the controller analyzes the display data to determine a plurality of grayscale values of a plurality of pixels in the display screen.

9. A display method with adjustable grayscale values, comprising:

receiving a display data of a display screen through a communication interface;

determining a plurality of grayscale values of a plurality of pixels in the display screen through analyzing the display data by the controller;

in response to the controller determining that the plurality of grayscale values of the plurality of pixels in the display screen are all higher than or equal to a first threshold, reducing at least part of the plurality of grayscale values through adjusting the display data by the controller; and driving the display panel to display the adjusted display screen according to the adjusted display data through the controller, wherein reducing at least part of the plurality of grayscale values through adjusting the display data by the controller comprises:

in response to the controller determining that a grayscale difference between any adjacent two of the plurality of pixels in the display screen is greater than a second threshold, reducing the one with a higher grayscale value among the any adjacent two of the plurality of pixels through adjusting the display data by the controller, so that the grayscale difference between the any adjacent two of the plurality of pixels is less than a third threshold.

10. The display method according to claim 9, wherein reducing at least part of the plurality of grayscale values through adjusting the display data by the controller comprises:

in response to the controller determining that the plurality of grayscale values of the plurality of pixels in the display screen are all a first grayscale value, reducing the plurality of grayscale values of the plurality of pixels to a second grayscale value through adjusting the display data by the controller, wherein the first grayscale value is greater than the second grayscale value.

11. The display method according to claim 10, wherein the first grayscale value is 255, and the second grayscale value is 125.

12. The display method according to claim 9, wherein reducing at least part of the plurality of grayscale values through adjusting the display data by the controller comprises:

in response to the controller determining that the plurality grayscale values of the plurality pixels in the display screen are higher than or equal to the first threshold, rolling off the plurality grayscale values though adjusting the display data by the controller.

13. The display method according to claim 9, wherein the first threshold is 180.

14. The display method according to claim 9, wherein the first threshold is greater than the second threshold and the third threshold, and the second threshold is greater than the third threshold.

15. The display method according to claim 9, wherein the second threshold is 125 and the third threshold is 50.

16. The display method according to claim 9, further comprising:

in response to a five-way key being triggered, determining a plurality of grayscale values of a plurality of pixels in the display screen through analyzing the display data through the controller.

* * * * *